United States Patent [19]

Gaylord

[11] 4,120,570

[45] * Oct. 17, 1978

[54] METHOD FOR CORRECTING VISUAL DEFECTS, COMPOSITIONS AND ARTICLES OF MANUFACTURE USEFUL THEREIN

[75] Inventor: Norman G. Gaylord, New Providence, N.J.

[73] Assignee: Syntex (U.S.A.) Inc., Palo Alto, Calif.

[*] Notice: The portion of the term of this patent subsequent to Apr. 30, 1991, has been disclaimed.

[21] Appl. No.: 830,509

[22] Filed: Sep. 6, 1977

Related U.S. Application Data

[63] Continuation of Ser. No. 698,592, Jun. 22, 1976, abandoned, which is a continuation of Ser. No. 548,209, Feb. 10, 1975, abandoned, which is a continuation-in-part of Ser. No. 461,882, Apr. 18, 1974, abandoned, which is a continuation-in-part of Ser. No. 263,541, Jun. 16, 1972, Pat. No. 3,808,178.

[51] Int. Cl.$^2$ .................. G02C 7/04; C08F 230/08
[52] U.S. Cl. .................. 351/40; 260/448.2B; 526/279; 264/1; 351/160
[58] Field of Search ............. 526/279; 260/46.54; 351/40, 160

[56] References Cited

U.S. PATENT DOCUMENTS

| | | | |
|---|---|---|---|
| 2,922,807 | 1/1960 | Merker | 260/448.2 |
| 2,956,044 | 10/1960 | Merker | 260/46.5 |
| 3,228,741 | 1/1966 | Becker | 351/160 |
| 3,808,178 | 4/1974 | Gaylod | 260/86.1 E |

OTHER PUBLICATIONS

Synthesis and Polymerization of Organosilicon Compounds Containing a Methacrylol Group, Bull. Acad. Sci. USSR Chem., No. 4, pp 467–472(1957).

*Primary Examiner*—Stanford M. Levin
*Attorney, Agent, or Firm*—Alan M. Krubiner; Joseph I. Hirsch

[57] ABSTRACT

Visual defects of the human eye in the form of refractive errors such as myopia, hyperiopia, astigmatism, athakis and keratoconus are corrected by a therapeutic method which includes the step of fitting to the patient's eye a corrective contact lens fabricated from a copolymer of a polysiloxanylalkyl acrylic ester and an alkyl acrylic ester. These visual corrections are made in accordance with this method with concommitent reduction in corneal edema since lenses so used have improved oxygen permeability. According to the preferred practice of this method, the lenses utilized have improved wettability which increases wearing confort and reduces interference with corneal metabolism, thereby extending the time period during which the corrective effect of the method is achieved. The corrective effect of this method is also enhanced by the capability of the lenses utilized therein to be precisely machined and polished.

1 Claim, No Drawings

METHOD FOR CORRECTING VISUAL DEFECTS, COMPOSITIONS AND ARTICLES OF MANUFACTURE USEFUL THEREIN

This is a continuation of application Ser. No. 698,592, filed June 22, 1976, abandoned, which is a continuation of application Ser. No. 548,209, filed Feb. 10, 1975, abandoned, which is a continuation-in-part of application Ser. No. 461,882, filed Apr. 18, 1974, abandoned, which is a continuation-in-part of application Ser. No. 263,541, filed June 16, 1972, now U.S. Pat. No. 3,808,178.

This invention relates to a method for correcting visual defects of the human eye. In this method, a contact lens is fitted to the patient's eye, the lens being oxygen permeable and wettable.

The prior art teaches the use of many different polymeric materials in contact lenses. However, although these polymers possess the optical clarity necessary for corrective lenses, they suffer from other characteristics which reduce their potential utility.

Poly(methyl methacrylate) is rigid and durable but relatively impermeable to oxygen. The hydrogel materials based on hydrophilic polymers such as poly(hydroxyethyl methacrylate) are soft and have poor durability. In addition, they provide an environment which is favorable for bacterial growth and are also relatively impermeable to oxygen.

Silicone rubber is soft and resilient and is highly permeable to oxygen. However, due to the low strength of polysiloxanes, a filler which increases the refractive index of the mixture, must be added to improve the durability. Further, the precision machining and polishing which is necessary in the fabrication of a corrective contact lens is extremely difficult with the elastomeric silicone rubbers.

Accordingly, it would be highly desirable to provide a method for correcting visual defects of the human eye in which a contact lens is employed which has increased oxygen permeability, is wettable, has improved mechanical strength, and which is sufficiently rigid to permit precision machining and polishing. The therapeutic method which I have discovered comprises correcting visual defects of the human eye in the form of refractive errors such as myopia, hyperopia, astigmatism, athakis and keratoconus, which method includes the step of fitting to the patient's eye a corrective contact lens fabricated from a copolymer of a polysiloxanylalkyl acrylic ester and an alkyl acrylic ester.

The copolymers used to fabricate the lenses which are employed in the practice of my method are prepared by copolymerizing a polysiloxanylalkyl ester of acrylic or methacrylic acid with an alkanol ester of acrylic or methacrylic acid.

The polysiloxanylalkyl ester monomer has the structural formula

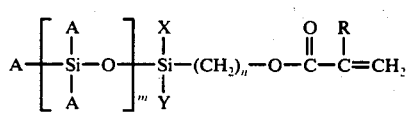

wherein X and Y are selected from the class consisting of $C_1$-$C_5$ alkyl groups, phenyl groups and Z groups; Z is a group of the structure

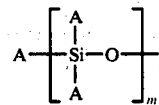

A is selected from the class consisting of $C_1$-$C_5$ alkyl groups and phenyl groups; R is selected from the class consisting of methyl groups and hydrogen; m is an integer from one to five; and n is an integer from one to three.

Representative polysiloxanylalkyl ester comonomers which may be employed include: pentamethyldisiloxanylmethyl methacrylate

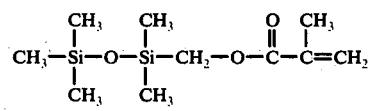

heptamethyltrisiloxanylethyl acrylate,

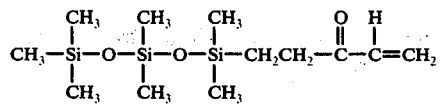

tris(trimethylsiloxy)-α-methacryloxypropylsilane,

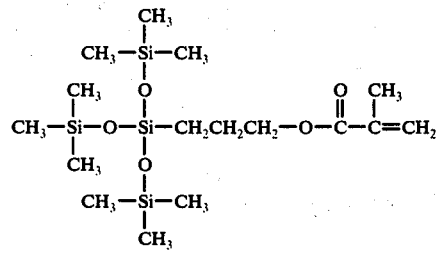

phenyltetramethyldisiloxanylethyl acrylate,

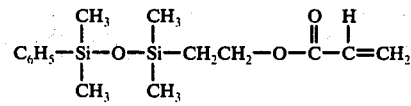

phenyltetraethyldisiloxanylethyl methacrylate,

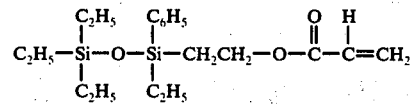

triphenyldimethyldisiloxanylmethyl acrylate,

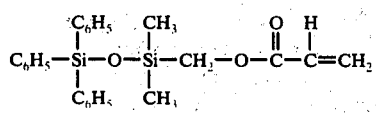

isobutylhexamethyltrisiloxanylmethyl methacrylate,

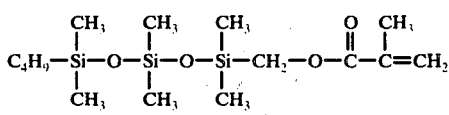

methyldi(trimethylsiloxy)-methacryloxymethylsilane,

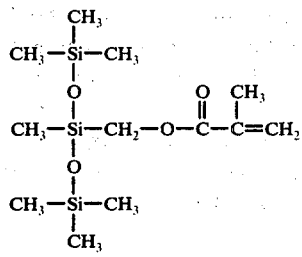

n-propyloctamethyltetrasiloxanylpropyl methacrylate,

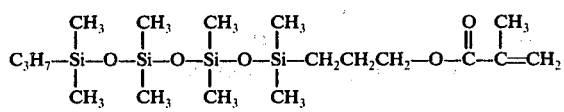

pentamethyldisiloxanyloxydi(trimethylsiloxy)-acryloxymethylsilane,

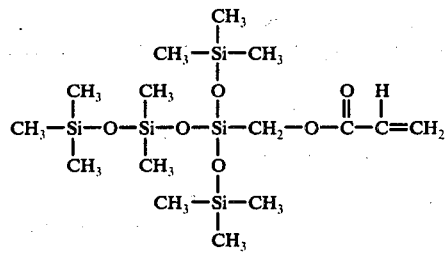

t-butyltetramethyldisiloxanylethyl acrylate,

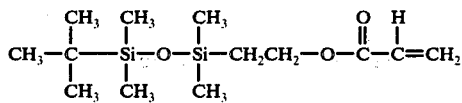

n-pentylhexamethyltrisiloxanylmethyl methacrylate,

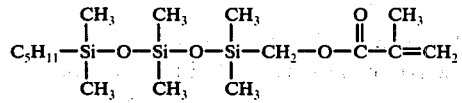

tri-i-propyltetramethyltrisiloxanylethyl acrylate,

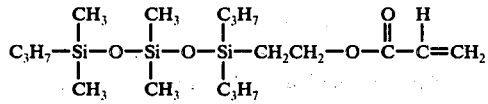

Representative alkanol ester comonomers which may be employed to form the copolymer include:
methyl acrylate and methacrylate
ethyl acrylate and methacrylate
propyl acrylate and methacrylate
isopropyl acrylate and methacrylate
butyl acrylate and methacrylate
amyl acrylate and methacrylate
hexyl acrylate and methacrylate
heptyl acrylate and methacrylate
octyl acrylate and methacrylate
2-ethylhexyl acrylate and methacrylate
nonyl acrylate and methacrylate
decyl acrylate and methacrylate
undecyl acrylate and methacrylate
lauryl acrylate and methacrylate
cetyl acrylate and methacrylate
octadecyl acrylate and methacrylate The copolymers comprise about 10–70 parts by weight of one or more of the polysiloxanylalkyl ester monomers copolymerized with about 30–90 parts by weight of one or more of the alkanol ester comonomers.

The copolymers are prepared by contacting the mixture of comonomers with a free radical generating polymerization initiator of the type commonly used in polymerizing ethylenically unsaturated compounds. Representative free radical polymerization initiators include:
acetyl peroxide
lauroyl peroxide
decanoyl peroxide
caprylyl peroxide
benzoyl peroxide
tertiary-butyl peroxypivalate
diisopropyl peroxycarbonate
tertiary-butyl peroctoate
α,α'-azobisisobutyronitrile Conventional polymerization techniques can be employed to produce the copolymers. The comonomer mixture containing between about 0.05–2% by weight of the free radical initiator is heated to a temperature between 30° C.–100° C., preferably below 70° C., to initiate polymerization and then to a higher temperature to complete the polymerization. The polymerization can be carried out directly in a contact lens mold to form a lens generally having the desired configuration. Alternatively, the polymerization mixture can be heated in a suitable mold or container to form discs, rods or sheets which can then be machined to the desired shape using conventional equipment and procedures employed for fabricating lenses from polymethyl methacrylate. The temperature is preferably maintained below 70° C. in order to minimize the formation of bubbles in the copolymer. Instead of employing the bulk polymerization techniques described above, one can employ solution, emulsion or suspension polymerization to prepare the copolymers, using techniques conventionally used in the preparation of polymers from ethylenically unsaturated monomers. The copolymer thus produced may be extruded, pressed or molded into rods, sheets or other convenient shapes which are then machined to produce the contact lenses.

The copolymers have vastly increased oxygen permeability in comparison to conventional contact lens materials. The oxygen permeability values are obtained using a YSI Model 53 oxygen monitor which employs a Clark-type electrode and is attached to a recorder. The test apparatus contains two chambers between which the lens is placed. The volume of fluid in the chambers is less than 1 ml. which permits an accurate evaluation of the total amount of oxygen appearing and disappearing on each side. The probe of the oxygen monitor is in contact with the fluid and a magnetic stirrer is present in each side of the two chambered system. Three ports on each chamber allow easy exchange and flushing of the oxygenated and non-oxygenated solutions used.

A lens is placed between the two chambers and clamped securely. The chambers are filled with distilled water and allowed to equilibrate at 34° C. in a water bath. The Clark electrodes are calibrated at 20.9% oxygen and at 95% oxygen at 34° C. and then one probe is placed in each chamber. The ports are closed with rubber stoppers and nitrogen-purged water is passed through both chambers. This gives three calibration points on the recorder, i.e., nitrogen-purged distilled water at 0% oxygen, room air equilibrated distilled water at 20.9% oxygen and distilled water containing 95% oxygen.

After the lens is placed between the chambers, time is allowed for oxygen to come out of the lens and equilibrate with nitrogen-water. When both chambers read 0 for 10 minutes, then the probe is removed from one chamber and immediately distilled water containing 95% oxygen and a bubbling device are are added to keep this chamber at a constant 95% oxygen level. The other chamber is then monitored as to flux of oxygen. The duration of the test is generally two hours. However, the change in partial pressure of oxygen during the first hour is used as a measure of oxygen permeability. When this change in partial pressure of oxygen in mm. Hg is divided by the thickness of the lens in millimeters, the oxygen permeability is reported in mm. Hg/mm.

When a 0.20 mm. thick lens made of poly(methyl methacrylate) is subjected to this test of oxygen permeability, there is no change in the partial pressure of oxygen, i.e., no permeation of oxygen through the lens, during the first hour. In contrast, when similar lenses prepared from the copolymers containing tris(trimethylsiloxy)methacryloxypropylsilane are subjected to the test, the oxygen permeability ranges from 100 to 1000 mm. Hg/mm.

While some of the copolymers are inherently wettable by human tears, it may be necessary to improve the wettability of others. This can be accomplished by several alternate methods. For example, wettability can be imparted to the copolymer by the addition of from about 0.1% to about 10% by weight of one or more hydrophilic monomers to the copolymerization mixture. Such monomers include hydroxyalkyl acrylates and methacrylates wherein the alkyl group contains 1 to 4 carbon atoms, acrylic and methacrylic acid, acrylamide, methacrylamide, N-methylolacrylamide, N-methylolmethacrylamide, glycidyl acrylate and methacrylate and N-vinylpyrrolidone. Alternatively, the wettability of the surface of contact lenses made from the copolymers can be improved by the application of a wetting agent such as, for example, a dilute aqueous solution of alkyldimethylbenzylammonium chloride, by exposure of the surface to a corona discharge or by chemical treatment of the surface with a strong oxidizing agent such as nitric acid.

The rigidity of the contact lenses prepared from materials useful in the practice of this invention may be varied by changing the ratio of comonomers and/or their chemical composition. Thus, contact lenses prepared from acrylate monomers are more flexible than those prepared from methacrylate monomers. A copolymer of a polysiloxanylalkyl methacrylate and an alkyl methacrylate may be fabricated into a contact lens which is more rigid than a lens prepared from the copolymer of the corresponding acrylates. The lower the alkyl methacrylate content of the copolymer the more flexible the contact lens prepared therefrom.

The rigidity of a contact lens prepared from the materials useful in the practice of this invention may be increased, if desired, by the incorporation into the copolymer composition of 0.01% to about 2% by weight of a crosslinking monomer such as a polyol dimethacrylate or diacrylate or a polyol acrylic ester of higher functionality, for example, ethylene glycol dimethacrylate, butylene glycol dimethacrylate, neopentyl glycol diacrylate, tetraethylene glycol dimethacrylate and pentaerythritol triacrylate or tetraacrylate.

The refractive index is an important but non-critical characteristic of a contact lens. Thus, the refractive index of poly(methyl methacrylate), the polymer most widely used in the fabrication of contact lenses, is 1.49. The refractive indices of the copolymers useful in the practice of this invention may be varied between 1.35 and 1.50 by varying the ratio and nature of the comonomers. In general, increasing the polysiloxanyl monomer content of the copolymer will decrease its refractive index. The nature of the substituents on the silicon atoms of the polysiloxanyl monomer also importantly affects the refractive index of the copolymer. Lower straight chain alkyl substituents produce copolymers of lower refractive index while polysiloxanyl monomers having phenyl substituents on the silicon atoms yield copolymers having a higher refractive index.

After preparation of the copolymers as described above, they are fabricated into contact lenses and the resultant lenses are fitted to the eye of the patient in accordance with the known prior art techniques for fabricating and fitting contact lenses fabricated of polymethyl methacrylate.

The following examples are presented to illustrate the practice of the invention and not as an indication of the limits of the scope thereof.

EXAMPLE 1

SYNTHESIS OF 1,1,1-TRIS(TRIMETHYLSILOXY)METHACRYLOXYPROPYLSILANE

A 10-liter round bottom flask equipped with a fractionating column topped by a distillation head and condenser was charged with 3540 g. of distilled trimethylchlorosilane, 3200 ml. of acetic anhydride and 50 ml. of triethanolamine. The flask was slowly heated and acetyl chloride was distilled from the reaction mixture at 45°–55° C. After 2 hours, the temperature was increased and 2340 g. of trimethylacetoxysilane (54%) was collected at 101°–110° C., density 1.17 g./cc. at 25° C.

A 2-liter beaker was charged with 730 g. of absolute ethanol and 1060 ml. of distilled water. The mixture was cooled in an ice water bath and 1500 g. of concentrated sulfuric acid was added slowly to the cold, stirring mixture.

A 10-liter round bottom flask equipped with a mechanical stirrer, thermometer and dropping funnel was charged with 1391 g. of distilled gamma-methacryloxypropyltrimethoxysilane, and 2223 g. of trimethylacetoxysilane. Ethylsulfuric acid, 365 g., prepared earlier, was added dropwise from the dropping funnel into the flask which was cooled in an ice water bath during the addition. After the catalyst addition was complete, the reaction mixture was stirred at room temperature for 48 hours. The upper oily layer was separated in a separatory funnel and washed several times with an aqueous 5% sodium bicarbonate solution. After washing several times with water, the organic layer was dried over anhydrous sodium sulfate. The dried product was distilled in vacuo in a rotating evaporator in order to remove methyl acetate. The distillation flask was immersed in a water bath whose temperature was maintained below 50° C. to facilitate removal of the methyl acetate while preventing premature polymerization of the monomer. The yield of 1,1,1-tris(trimethylsiloxy)-methacryloxypropylsilane was 1500 g. (71%).

A 3-liter Erlenmeyer flask equipped with a mechanical stirrer was charged with 1000 g. of the polysiloxane monomer, 500 ml. of diethyl ether and 500 g. of activated alumina. The mixture was stirred for 2 hours at room temperature and then filtered. The filtrate was evaporated in vacuo to remove the ether. Approximately 900 g. of colorless polysiloxane monomer was recovered.

EXAMPLE 2

A mixture of 55 parts of the polysiloxane monomer of Example 1, 45 parts of methyl methacrylate, 1 part of ethylene glycol dimethacrylate, 5 parts of hydroxyethyl methacrylate and 0.12 weight-% of tert-butyl peroxypivalate is placed in a polyethylene cap which is purged with nitrogen and then closed with an airtight polyethylene lid. The cap is placed in an oven which is maintained at 50° C. for 48 hours, followed by 24 hours at 85° C. The resultant hard, transparent cylindrical plug is machined, cut, polished and finished to a concavoconvex lens.

The oxygen permeability of a 0.19 mm. thick lens is measured in the apparatus described in the specification. The change in partial pressure of oxygen is 84.3 mm. Hg in the first hour or 444 mm. Hg/mm.

EXAMPLE 3

A mixture of 60 parts of the polysiloxane monomer of Example 1, 40 parts of methyl methacrylate, 1 part of ethylene glycol dimethacrylate, 5 parts of hydroxyethyl methacrylate and 0.12 weight-% of tert-butyl peroxypivalate is polymerized in a polyethylene cap at 50° C. for 48 hours, followed by 24 hours at 85° C. The resultant hard, transparent cylindrical plug is machined, cut, polished and finished to a concavo-convex lens.

The oxygen permeability of a 0.22 mm. thick lens is measured in the test apparatus and the change in partial pressure of oxygen is found to be 131.1 mm. Hg in the first hour or 596 mm. Hg/mm.

EXAMPLE 4

A mixture of 45 parts of the polysiloxane monomer of Example 1, 55 parts of methyl methacrylate, 2 parts of methacrylic acid and 0.12 weight-% of tert-butyl peroxypivalate is polymerized in a polyethylene cap at 50° C. for 48 hours, followed by 24 hours at 85° C. The resultant hard, transparent cylindrical plug is machined, cut, polished and finished to a concavo-convex lens which is oxygen-permeable.

The wettability of the lens surfaces is determined by rubbing a wetting agent solution, of the type normally used for contact lenses, onto the lens surfaces, rinsing in tap water, re-rubbing the wetting agent onto the lens surfaces with the fingers, re-rinsing in tap water, shaking off the excess and examining the surfaces under overhead lighting to see if a complete film of water remains on the surface or if the water collects in droplets. The lens prepared from the terpolymer of this example has good wettability as indicated by the formation of a complete film of water on the surfaces.

EXAMPLE 5

A mixture of 55 parts of the polysiloxane monomer of Example 1, 45 parts of methyl methacrylate, 2 parts of methacrylic acid and 0.12 weight-% of tert-butyl peroxypivalate is polymerized in a polyethylene cap at 50° C. for 48 hours, followed by 24 hours at 85° C. The resultant hard, transparent cylindrical plug is machined, cut and polished to a button with a flat surface.

A contact angle measurement obtained by placing a drop of water on the polished flat surface indicates a contact angle of 60°. After treatment of the surface with a high voltage corona discharge, the contact angle is 10°.

A lens prepared from the terpolymer is hard, transparent and oxygen-permeable. The lens is readily wetted with a wetting agent solution. Upon treatment with a corona discharge, the lens is readily wetted with water.

EXAMPLE 6

A mixture of 50 parts of the polysiloxane monomer of Example 1, 50 parts of methyl methacrylate, 2 parts of methacrylic acid, 2 parts of tetraethylene glycol dimethacrylate and 0.12 weight-% of tert-butyl peroxypivalate is polymerized in a polypropylene tube at 50° C. for 48 hours, followed by 24 hours at 85° C. The resultant hard, transparent cylindrical rod is cut into sections which are machined, cut, polished and finished to concavo-convex lenses which are wettable and oxygen-permeable.

EXAMPLE 7

A cylindrical plug is prepared by polymerizing a mixture of 40 parts of the polysiloxane monomer of Example 1 and 60 parts of methyl methacrylate in the presence of tert-butyl peroxypivalate at 50° C. Lenses prepared from the plug are hard, transparent and oxygen-permeable.

EXAMPLE 8

This example illustrates the synthesis of a representative polysiloxanylalkyl ester comonomer, pentamethyldisiloxanylmethyl methacrylate.

Synthesis of Dimethylchloromethylchlorosilane

Distilled trimethylchlorosilane (635 ml., 5 moles), b.p. 59.9° C., is placed in a 1-liter, 3-necked, round-bottom flask equipped with a magnetic stirrer, a thermometer, a gas inlet tube and a dry-ice cooled reflux condenser whose outlet is connected to a water scrubber. After flushing the apparatus with dry nitrogen for 15 minutes, chlorine gas is introduced through the gas inlet tube and the flask is irradiated by ultraviolet light from a General Electric 15-watt germicidal lamp placed at a distance of 6 in. from the flask. Gaseous hydrogen chloride is evolved and absorbed in the water scrubber which contains a caustic soda solution and a small amount of phenolphthalein. The temperature is maintained in the range 30°–40° C. while chlorine is bubbled through the reaction mixture. After 30 hours of photochlorination, 5 moles of hydrogen chloride is evolved, as indicated by the discharge of the pink color in the water scrubber. The product is distilled through a column with 18 theoretical plates and the fraction distilling at 115° C. is collected. The yield of dimethylchloromethylchlorosilane ($d^{25}$ = 1.07) is 30%.

Synthesis of Pentamethylchloromethyldisiloxane 134 ml. dimethylchloromethylchlorosilane (1 mole) and 127 ml. (1 mole) of trimethylchlorosilane are mixed and shaken thoroughly. When 600 ml. of distilled water is added, exothermic hydrolytic reactions occur immediately. The mixture is shaken on a mechanical shaker overnight to complete hydrolysis. The upper oily layer is separated and is dried over anhydrous sodium carbonate. After drying, the product is distilled through a column of 13 theoretical plates and the fraction which distills at 151°–152° C. is collected. The yield of pentamethylchloromethyldisiloxane (b.p. 151.8° C., $d^{25}$ = 0.910, $n_D^{20}$ = 1.4106) is 30%.

Synthesis of Pentamethyldisiloxanylmethyl Methacrylate 30 ml. pentamethylchloromethyldisiloxane (0.14 mole), 13.8 ml. (0.16 mole) distilled methacrylic acid, 21.0 ml. (0.15 mole) triethylamine, 30 ml. xylene and 0.8 g. hydroquinone are mixed and refluxed for 16 hours. Triethylamine hydrochloride precipitates and is filtered. The filtrate is mixed with 1 g. of hydroquinone and 1 g. of copper powder. Xylene is distilled from the mixture at atmospheric pressure. The distillation apparatus is then connected to a vacuum line and the fraction which distills at 73°–75° C. under 4–5 mm. Hg pressure is collected. The yield of pentamethyldisiloxanylmethyl methacrylate (b.p. 73°–74° C./4 mm. Hg, $d^{20}$ = 0.910, $n_D^{20}$ = 1.420) is 45%.

The disiloxane monomer recovered by distillation contains co-distilled hydroquinone. Purification is accomplished by washing the monomer with aqueous alkali solution containing 25% sodium carbonate and 1% sodium hydroxide until the aqueous layer is colorless. The oily monomer layer is then washed with water until neutral and dried over anhydrous sodium carbonate. The dried monomer is refrigerated until used.

EXAMPLE 9

This example illustrates the preparation of a representative oxygen-permeable copolymer.

A mixture of 35 parts of the disiloxane monomer of Example 8, 65 parts of methyl methacrylate and 0.004 ml. of tert-butyl peroxypivalate per ml. of monomer mixture is placed in a polypropylene Petri dish to a height of one-eighth of an inch. The dish is covered and placed in a vacuum oven which has been purged with nitrogen. The oven is closed and the temperature is maintained at 45° C. for 20 hours. The copolymer disc is hard, colorless, transparent and rigid. The oxygen permeability is 500 cc.-mil/100 in.$^2$/24 hr./atm.

The oxygen permeability of a disc of polymethylmethacrylate is 34 cc.-mil/100 in.$^2$/24 hr./atm. while that of a disc of polyhydroxyethylmethacrylate is 13 cc.-mil/100 in.$^2$/24 hr./atm.

A cylindrical plug having dimensions of ¼ inch thickness and ½ inch diameter is prepared by copolymerizing the 35/65 disiloxane monomer/methyl methacrylate mixture in a polyethylene cap at 45° C. for 20 hours. The plug is machined, cut, polished and finished to a concavo-convex lens.

EXAMPLES 10–16

These examples illustrate the preparation and properties of copolymers containing varying proportions of a siloxanyl monomer, methyl methacrylate, and a hydrophilic monomer (hydroxyethyl methacrylate).

Mixtures of the disiloxane monomer of Example 8 (DSM), methyl methacrylate (MMA), hydroxyethyl methacrylate (HEMA) and tert-butyl peroxypivalate (0.004 ml. per ml. of monomer mixture) is polymerized in polyethylene caps under the conditions shown in the following table:

| Example | Composition, wt.% | | | Temp. ° C. | Time hr. | Properties* |
|---|---|---|---|---|---|---|
| | DSM | MMA | HEMA | | | |
| 10 | 20 | 75 | 5 | 50 | 6.5 | T, H, R |
| 11 | 35 | 60 | 5 | 45 | 20 | T, H, R |
| 12 | 44 | 50 | 6 | 50 | 48 | T, H, SR |
| 13 | 45 | 50 | 5 | 45 | 20 | T, H, SR |
| 14 | 45 | 49 | 6 | 70 | 1 | T, H, SR |
| | | | | 50 | 16 | |
| 15 | 51 | 40 | 9 | 75 | 2.5 | T, H, SR |
| 16 | 65 | 30 | 5 | 60 | 4 | MT, S, R |

*T = transparent;
H = hard;
R = Rigid;
SR = Semi-rigid;
NT = hazy;
S = soft;
E = elastomeric The polymerized plugs are machined and finished in the usual manner to lenses with a concave surface on one side and a convex surface on the opposite side. The lenses are easily wetted by water and an aqueous saline solution.

EXAMPLE 17

This example illustrates the preparation and properties of a wettable oxygen-permeable terpolymer.

A disc is prepared in the manner described in Example 9 from a mixture of 45 parts of the disiloxane monomer of Example 8, 50 parts of methyl methacrylate and 5 parts of hydroxyethylmethacrylate using tert-butyl peroxypivalate as catalyst. The polymerization is carried out at 45° C. for 20 hours. The resultant disc is colorless, transparent, hard and semi-rigid. The surface of the disc is readily wetted by water and saline solution. The oxygen permeability of the terpolymer is 765 cc.-mil/100 in.$^2$/24 hr./atm.

EXAMPLE 18

This example illustrates the preparation and properties of a wettable oxygen-permeable terpolymer.

A disc prepared in the same manner described in Example 9 by polymerizing a mixture of 20 parts of the disiloxane monomer of Example 8, 75 parts of methyl methacrylate, 5 parts of hydroxyethyl methacrylate and 0.004 ml. of tert-butyl peroxypivalate per ml. of monomer mixture, at 50° C. has an oxygen permeability of 135 cc.-mil/100 in.$^2$/24 hr./atm. Lenses cut and machined from the disc are transparent, hard and rigid.

EXAMPLES 19–21

These examples illustrate the preparation and properties of copolymers of a siloxanyl monomer with various proportions of other methacrylate ester comonomers.

Cylindrical plugs are prepared in the manner described in Example 10 from mixtures of the disiloxane monomer (DSM) of Example 8, methyl methacrylate (MMA), octadecyl methacrylate (ODMA), hydroxyethyl methacrylate (HEMA) and ethylene glycol dimethacrylate (EGDMA) by polymerization at 70° C. for 2.5 hours using tert-butyl peroxypivalate as catalyst.

The properties of lenses prepared from the plugs are shown in the following table:

| Example | Composition, wt.% | | | | | Properties |
|---|---|---|---|---|---|---|
| | DSM | MMA | ODMA | HEMA | EGDMA | |
| 19 | 35 | 30 | 30 | 5 | 0 | T, H, E |
| 20 | 45 | 30 | 20 | 5 | 0 | T, S, E |
| 21 | 45 | 38 | 10 | 5 | 2 | T, S, R |

EXAMPLE 22

This example illustrates the synthesis of 1,1,1-tris(-trimethylsiloxy)methacrylatopropylsilane.

23.8 g. (13.0 ml.) of concentrated sulfuric acid is added slowly with stirring to a mixture of 11.6 g. (14.7 ml.) of absolute ethanol and 16.5 ml. of water. The mixture is cooled in a water bath.

Methacrylatopropyltrimethoxysilane (0.1 mole, 24.8 g.), is mixed with 0.3 mole (39.6 g.) of trimethylacetoxysilane in a flask equipped with a magnetic stirrer. Ethylsulfuric acid (6.5 g.), prepared as described above, is added dropwise from a dropping funnel into the stirred mixture. The flask is cooled during the addition of the ethylsulfuric acid catalyst solution in an ice water bath. After completion of the catalyst addition, the solution is stirred at room temperature for 2 days. The upper oily layer is then separated, washed with sodium bicarbonate solution, washed with water and then dried over anhydrous sodium sulfate. The product is distilled under vacuum to remove ethyl acetate. The distillation flask is immersed in a water bath whose temperature is maintained at 40°-45° C. to prevent premature polymerization of the monomer. The yield of tris(trimethylsiloxy)methacrylatopropylsilane is 86% and the density of the monomer is 0.989 g./cc. at 20° C. The monomer is refrigerated until used.

EXAMPLE 23

This example illustrates the preparation of a copolymer of methyl methacrylate with the polysiloxanyl ester of Example 22.

A cylindrical plug is prepared by polymerizing a mixture of 40 parts of tris(trimethylsiloxy)- -methacryloxypropylsilane and 60 parts of methyl methacrylate in the presence of tert-butyl peroxypivalate at 50° C. Lenses prepared from the plug are hard, transparent and oxygen-permeable.

EXAMPLE 24-35

This example illustrates the preparation of various copolymers of polysiloxanyl esters and various alkyl acrylates or methacrylates. The polysiloxanyl ester comonomers are prepared according to the general techniques of Examples 8 and 22. The copolymer is prepared according to the general technique of Example 9. All copolymers resulting are transparent, hard and rigid so as to be suitable for contact lens manufacture. The oxygen permeability of the copolymers varies from 300–500 cc.-mil/100 in.$^2$/24 hr./atm. as measured by the technique previously described.

| POLYSILOXANYL ESTER | | ALKANOL ESTER | |
|---|---|---|---|
| Wt.% in Copolymer | Monomer | Wt.% in Copolymer | Monomer |
| 35 | heptamethyltrisiloxanylethyl acrylate | 65 | 2-ethylhexyl acrylate |
| 30 | isobutylhexamethyltrisiloxanylmethyl methacrylate | 70 | t-butyl methacrylate |
| 30 | n-propyloctamethyltetrasiloxanylpropyl methacrylate | 70 | decyl methacrylate |
| 25 | tri-i-propyltetramethyltrisiloxanylethyl acrylate | 75 | isopropyl acrylate |
| 25 | t-butyltetramethyldisiloxanylethyl acrylate | 75 | methyl acrylate |
| 20 | n-pentylhexamethyltrisiloxanylmethyl methacrylate | 80 | ethyl methacrylate |
| 20 | phenyltetramethyldisiloxanylethyl acrylate | 80 | octadecyl acrylate |
| 20 | phenyltetraethyldisiloxanylethyl methacrylate | 80 | hexyl methacrylate |
| 15 | triphenyldimethylsiloxanylmethyl acrylate | 85 | methyl acrylate |
| 15 | tris(trimethylsiloxy)-α-methacryloxypropylsilane | 85 | methyl methacrylate |
| 15 | methyldi(trimethylsiloxy)-methacryloxymethylsilane | 85 | n-propyl methacrylate |
| 10 | pentamethyldi(trimethylsiloxy)-acryloxymethylsilane | 90 | ethyl acrylate |

As illustrated by Examples 24–35, it is preferred to use a straight chain alkanol ester monomer if the polysiloxanyl ester monomer is a branched chain compound, and vice versa. Also, it is preferred to employ two acrylate or two methacrylate comonomers to prepare the copolymer, rather than an acrylate monomer and a methacrylate monomer. Finally, where more complex polysiloxanyl ester comonomers are employed, the proportion of polysiloxanyl ester is lower, e.g., 10–20%, than if simpler polysiloxanyl esters are employed. In general, the presence of larger, more complex substituents on the interior silicon atoms tend to increase the refractive index of the copolymer, all other factors being equal.

Having described my invention in such clear, concise and exact terms as to enable any person skilled in the art to understand and practice it, and having identified the presently preferred embodiment thereof, I claim:

1. Method of treating visual defects of the human eye in the form of refractive errors which includes the step of fitting to the patient's eye a corrective contact lens fabricated from a solid copolymer of comonomers, said copolymer having increased oxygen permeability in comparison with poly(methylmethacrylate) and consisting essentially of (a) about 10 to 70 parts by weight of a polysiloxanylalkyl ester of the structure.

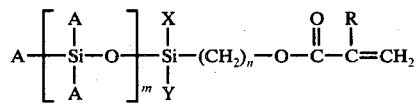

wherein
(1) X and Y are selected from the class consisting of $C_1$-$C_5$ alkyl groups, phenyl groups and Z groups,
(2) Z is a group of the structure

(3) A is selected from the class consisting of $C_1$–$C_5$ alkyl groups and phenyl groups,
(4) R is selected from the class consisting of methyl groups and hydrogen,
(5) $m$ is an integer frome one to five, and
(6) $n$ is an integer from one to three; and
(b) about 30 to 90 parts by weight of an ester of a $C_1$–$C_{20}$ monohydric alkanol and an acid selected from the class consisting of acrylic and methacrylic acids.

UNITED STATES PATENT AND TRADEMARK OFFICE
CERTIFICATE OF CORRECTION

PATENT NO. : 4,120,570

DATED : Oct. 17, 1978

INVENTOR(S) : Norman G. Gaylord

It is certified that error appears in the above-identified patent and that said Letters Patent are hereby corrected as shown below:

Column 2, line 32, "tris(trimethylsiloxy)-α-methacryloxypropylsilane" should read --tris(trimethylsiloxy)-γ-methacryloxypropylsilane--. In lines 55-59, the formula for phenyltetraethyldisiloxanylethyl methacrylate reading:

Line 60, "triphenyldimethyldisiloxyanylmethyl acrylate" should read --triphenyldimethyldisiloxanylmethyl acrylate--.

Column 3, lines 27-28, "pentamethyldisiloxanyloxydi(trimethylsiloxy)-acryloxymethylsilane" should read --pentamethyldi(trimethylsiloxy)-acryloxymethylsilane--.

Column 5, line 20, "are are added" should be --are added--.

Column 7, lines 9-10, "1,1,1-tris(trimethylsiloxy)- methacryloxypropylsilane" should read --1,1,1-tris(trimethylsiloxy)-γ-methacryloxypropylsilane--. Lines 30-31, "conca-voconvex" should read --concavo-convex--.

Column 10, line 18 (the bottom line of the table) "MT" should be --NT--.

Column 11, line 23 (the bottom line of the table) should appear in line 8, above the top of the table in Column 12. Column 11, lines 27-28, "1,1,1-tris-(-trimethylsiloxy)methacrylatopropylsilane" should read --1,1,1-tris(trimethylsiloxy)-γ-methacryloxypropylsilane--. Line 33, "Methacrylatopropyltrimethoxysilane" should read --Methacryloxypropyltrimethoxysilane--. Lines 58-59, "tris(trimethylsiloxy)- -methacryloxypropylsilane" should read --tris(trimethylsiloxy)-γ-methacryloxypropylsilane--.

Column 12, about line 19 (Example 33 in the table), "tris(trimethylsiloxy)-α-methacryloxypropylsilane" should read --tris(trimethylsiloxy)-γ-methacryloxypropylsilane--. Lines 64-68, the formula reading:

UNITED STATES PATENT AND TRADEMARK OFFICE
CERTIFICATE OF CORRECTION

PATENT NO. : 4,120,570

DATED : Oct. 17, 1978

INVENTOR(S) : Norman G. Gaylord

It is certified that error appears in the above-identified patent and that said Letters Patent are hereby corrected as shown below:

   should read:   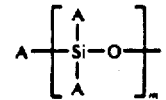

Column 13, line 6, "frome" should be --from--.

Signed and Sealed this

Twelfth Day of June 1984

[SEAL]

Attest:

Attesting Officer

GERALD J. MOSSINGHOFF

Commissioner of Patents and Trademarks